H. L. RICHENDIFER.
LAWN MOWER.
APPLICATION FILED JULY 13, 1920.

1,382,441. Patented June 21, 1921.

WITNESSES
G. C. Walling
S. W. Foster

INVENTOR
H. L. Richendifer
BY Munn & Co
ATTORNEYS

UNITED STATES PATENT OFFICE.

HARMAN L. RICHENDIFER, OF BLADEN, NEBRASKA.

LAWN-MOWER.

1,382,441.  Specification of Letters Patent.  Patented June 21, 1921.

Application filed July 13, 1920. Serial No. 395,920.

*To all whom it may concern:*

Be it known that I, HARMAN L. RICHENDIFER, a citizen of the United States, and a resident of Bladen, in the county of Webster and State of Nebraska, have invented a new and Improved Lawn-Mower, of which the following is a full, clear, and exact description.

This invention relates to improvements in lawn mowers, an object of the invention being to provide a lawn mower which can be easily and conveniently operated and which will evenly cut grass of any height.

A further object is to provide a lawn mower which will cut the grass in awkward places not conveniently reached by the ordinary type of lawn mower, and which will also cut weeds or other upstanding growths as well as grass and not mash the same down as is the case with lawn mowers in ordinary use.

A further object is to provide a lawn mower which can be easily assembled and taken apart, cleaned and repaired by any one of average intelligence not requiring skilled labor.

With these and other objects in view the invention consists in certain novel features of construction, and combinations and arrangements of parts as will be more fully hereinafter described and pointed out in the claims.

In the accompanying drawings—

Figure 1:
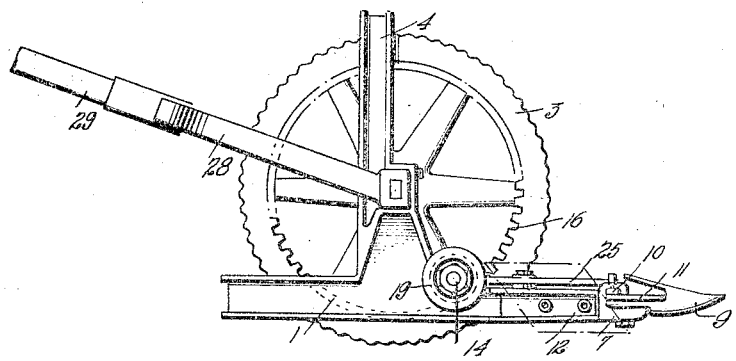
Figure 1 is a view in side elevation illustrating my improved lawn mower.
Figure 2:
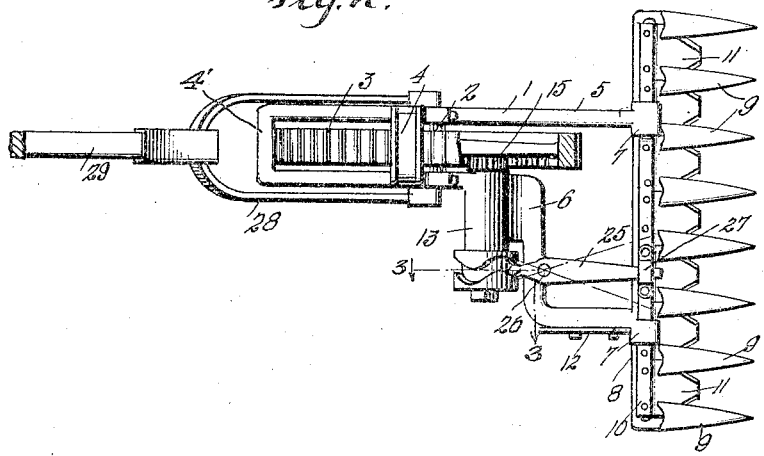
Fig. 2 is a top plan view.
Figure 3:
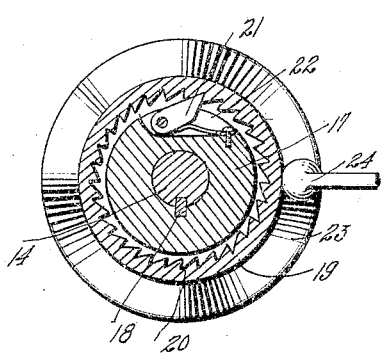
Fig. 3 is an enlarged view in section on the line 3—3 of Fig. 2.

1 represents the frame of my improved lawn mower which is supported on an axle 2, the latter mounted in a single supporting wheel 3 having any approved form of traction surface to insure a turning movement of the wheel when the lawn mower is moved over the ground.

The frame 1 has a strengthening fork 4 which extends over and straddles the wheel 3 includes a similar yoke or fork 4' parallel to the ground straddling the wheel 3 and having its intermediate portion located behind the wheel 3 and is made with a pair of forwardly projecting arms 5 and 6 having brackets 7 at their forward ends which are secured to a mower bar 8 and support the latter. Guard fingers 9 are secured to the mower bar and a cutter bar 10 is mounted on the mower bar and provided with cutting blades 11 movable through the guard fingers and operating as an ordinary reciprocating cycle to cut the grass.

An angle bar 12 is bolted to frame bar 6 and to the mower bar 8 to strengthen the connection and a bearing sleeve 13 is made integral with the arm 6 of frame 1 and is located parallel to the mower bar but spaced an appreciable distance in the rear thereof.

In this bearing 13 a short shaft 14 is mounted to turn and is provided at one end with a pinion 15 meshing with an internal rack 16 in the wheel 3 so that as the wheel 3 moves over the ground, it operates to turn the shaft 14. A disk 17 is keyed to the shaft 14 as shown at 18, and a cam ring 19 is located around the outside of the disk 17 and is provided with internal ratchet teeth 20 engaged by a spring pressed pawl 21 pivotally supported in a recess 22 in the disk 17, so that when the shaft 14 is turned in one direction, which is the normal forward direction of movement of the lawn mower, the ring 19 is turned with the shaft, but when the shaft 14 is turned in the opposite direction, the pawl 21 will ride idly around the ratchet teeth 20.

This ring 19 is made with a cam groove 23 in which the rear end 24 of a lever 25 is positioned. This lever 25 is pivotally supported between its ends on the arm 6, as shown at 26, and at its forward end projects through a bracket 27 on the cutter bar 10, so that the oscillation of the lever due to its engagement with the cam groove of ring 19, will impart a reciprocating movement to the cutter.

A handle fork 28 is secured to frame 1 and is provided with a handle 29 projecting upwardly and rearwardly therefrom for convenient manipulation of the lawn mower.

When the lawn mower is moved forwardly over the ground, the wheel 3, through the medium of rack 16 and pinion 15, imparts rotary motion to the shaft 14, and the pawl 21 being locked in engagement with the ratchet teeth 20 will compel the ring 19 to turn with the shaft 14 and cause an oscillating motion to be imparted to the lever 25 and the latter will impart a reciprocating motion to the cutter bar 10 to sever the grass as will be understood.

When the wheel 3 is moved rearwardly, or, in other words, when the lawn mower is drawn backwardly, the pawl 21 will ride idly over the ratchet teeth 20 so that motion will not be imparted to the ring 19 of the cutter.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A mower comprising a single traction wheel, a framework supported on the wheel axle and including a pair of forwardly extending arms located one on each side of the wheel, a cutter supported on the forward ends of the arms, a vertically disposed inverted U-shaped strengthening yoke fixed to the framework and straddling the wheel, a handle member connected to the framework and means operatively connecting the cutter bar and the traction wheel.

2. A mower comprising a single traction wheel, a framework supported on the wheel axle, said framework including forwardly extending arms located one on each side of the wheel, a cutter supported on the forward ends of the arms, a vertically disposed inverted U-shaped strengthening yoke integral with the framework and straddling the wheel, an upwardly and rearwardly extending yoke secured to the framework, a handle on said last-mentioned yoke, a bearing sleeve integral with one of the forwardly extending arms, an actuator supported in the bearing sleeve, means operatively connecting the actuator to the cutter and means operatively connecting the traction wheel to the actuator.

3. In a lawn mower a single traction wheel, a U-shaped yoke suspended from the wheel axle and disposed parallel to the ground, and having its intermediate portion located behind said wheel, said yoke terminating in a pair of forwardly projecting arms, a cutter supported on the forward ends of the arms, a vertically disposed inverted U-shaped straddling yoke integral with the first-mentioned yoke and straddling the wheel, a handle having a bifurcated end straddling the last-mentioned yoke and connected thereto and means supported on one of the forwardly projecting arms operatively connecting the traction wheel and the cutter.

HARMAN L. RICHENDIFER.